July 26, 1938.  W. K. HODGMAN, JR  2,124,995
DRY PIPE VALVE
Filed Aug. 1, 1936

Inventor.
Willis K. Hodgman Jr.
by Heard Smith & Tennant.
Attys.

Patented July 26, 1938

2,124,995

UNITED STATES PATENT OFFICE 2,124,995

DRY PIPE VALVE

Willis K. Hodgman, Jr., Taunton, Mass.

Application August 1, 1936, Serial No. 93,853

3 Claims. (Cl. 169—22)

This invention relates to a dry pipe valve designed for use in a system employing sprinkler heads for fire prevention.

The object of the invention is to provide a construction of dry pipe valve which shall be as compact as possible, which shall be of especially simple and rugged construction, and which shall enable the air and water valves to be swung through the inspection opening of the casing in a position where they may be readily cleaned or repaired.

These and other features of the invention will appear more fully from the accompanying description and drawing, and will be particularly pointed out in the claims.

The drawing illustrates a dry pipe valve embodying a preferred form of the invention in which.

Figure 1:
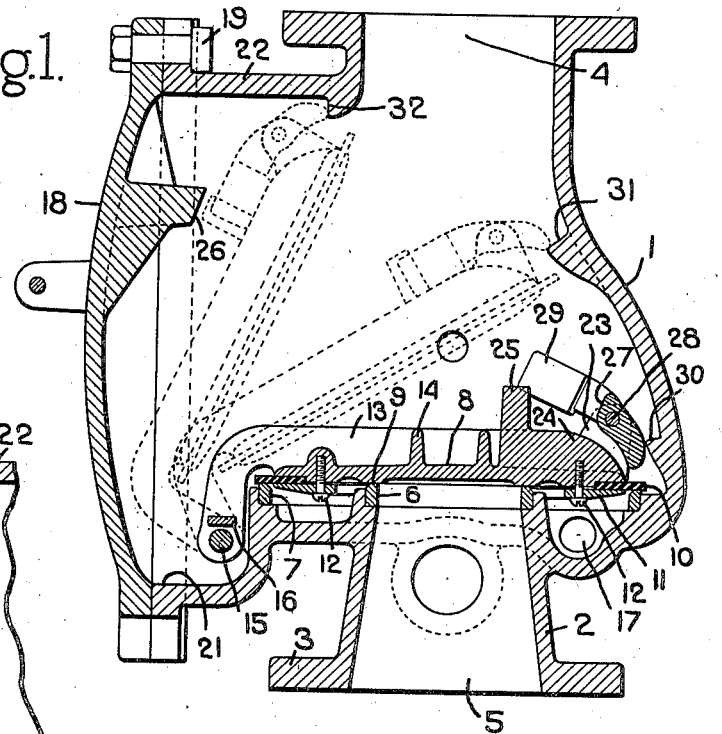
Fig. 1 is a view in central, vertical cross section.

As the general construction, purpose and use of a dry pipe valve is well known and familiar to those skilled in the art, it is only necessary here to describe in detail those features with which the present invention is particularly concerned.

Such a dry pipe valve is designed particularly for use in controlling the supply of water through the main pipe of a fire prevention sprinkler system to the sprinkler heads. Normally the valve mechanism of the dry pipe valve is maintained closed by the differential in pressure between the air trapped in the sprinkler system and the water supply beneath the valves. When a sprinkler head opens, the valves of the dry pipe valve open and admit water to the entire system. Dry pipe valves are necessarily of substantial size, and it is an important object of the present invention to reduce this size to the minimum compatible with maintaining a simple, rugged and durable construction. This is accomplished in the present invention by coordination of the various elements of the device.

It is important in a dry pipe valve that the valve parts and surfaces shall be kept in perfect condition and that, therefore, they shall be readily accessible for cleaning, repair or replacement. An important feature of this valve is the construction which enables the clapper carrying both the water and air valves to be swung through the inspection opening of the casing so that the valves are presented in such a position that they are outside the main body of the casing and readily accessible. With this invention this result is effected without increasing the size of the casing beyond that necessary for the functioning of the valves.

It is important also in a dry pipe valve that means shall be provided to lock the valves against closing whenever they have moved to a predetermined slightly open position because, as is well known, water columning would otherwise take place and the dry pipe valve would thus be prevented from functioning upon the occurrence of a fire. And it is further desirable that means shall be provided for retaining the valves in a wide open position when they have moved to that position. The present invention enables these things to be done in a simple and never-failing way by a construction which also requires no increase in the size of the valve casing beyond that necessary for the functioning of the valves.

The entire valve is thus made as compact as possible and at the same time of simple and rugged construction, able to meet all the requirements of such a device.

The preferred construction illustrated comprises the usual cast metal casing 1 having at the bottom an inward and upward projecting inlet pipe 2 with a flange 3 at its base, by means of which it is secured in the water main. At the top the casing is provided with an exit opening 4, also having a suitable flange to fit in the water main. The size of the entire casing depends first upon the size of the water main in which the dry pipe valve is expected to be installed. In the present construction, the overall size is first reduced by utilizing the tapered inlet pipe. It will be seen that the inlet pipe 2 tapers upward from the inlet opening 5 to the water valve seat 6 at the upper end of the inlet. Thus, as is well known, the size of the valve structure required is materially reduced while, by utilizing the venturi principle, the volume and rate of flow remain the same as if the inlet pipe had not thus been tapered.

In the present invention the air valve seat 7 is located on the casing surrounding and substantially in the plane of the water valve seat 6 and preferably concentric therewith. This enables the valve structure cooperating with the valve seats to be compact.

The air valve structure cooperating with the valve seats is in the form of a clapper, the main portion of which is preferably made of a single casting. The body 8 of the clapper is in the general form of a circular disk having on its lower face an annular rib 9 which fits against the water valve seat 6 to constitute the water valve. The portion of the clapper 8 surrounding and concentric with the water valve 9 forms the base for the air valve. The air valve is flexible so that its engagement with the air valve seat 7 is assured when the water valve 9 is seated upon the water valve seat 6. This air valve is shown in the form of a flexible rubber annulus 10 fitting into a recess in the bottom of the clapper and held in place by a metal clamping ring 11 secured to the clapper by screws 12.

The clapper is provided with a supporting arm preferably cast integrally therewith. This arm in the construction illustrated is in the form of two ribs 13 extending across the body 8 of the clapper and thus giving rigidity thereto. Preferably also, transverse ribs 14 are formed on the clapper base to insure rigidity. The ribs 13 of the supporting arm at their free ends are pivotally mounted on a shaft 15 and are secured together by a transverse brace 16.

It will thus be seen that the clapper and its valves constitute a relatively thin, flat structure. The clapper is held in closed position with the valves upon their respective seats by the pressure of the air above the valve which may be much less, in accordance with well-known practice, than the water pressure, because the air pressure acts upon a much greater area of the clapper than does the water pressure. The neutral chamber formed between the valve seats is connected at 17 to any suitable drainage and check valve construction.

The valve casing 1 is provided at the side adjacent the shaft 15 with a large inspection opening. This inspection opening is normally closed by a cover plate 18 removably secured in place by bolts 19.

Figure 2:
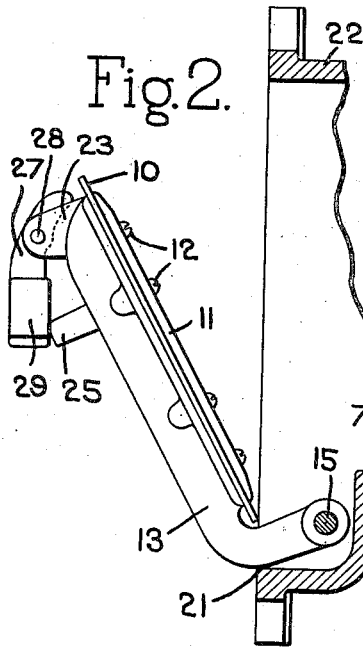
Fig. 2 is a detail partially in vertical cross section showing the clapper with its valves in position for cleaning or repair.
Figure 3:
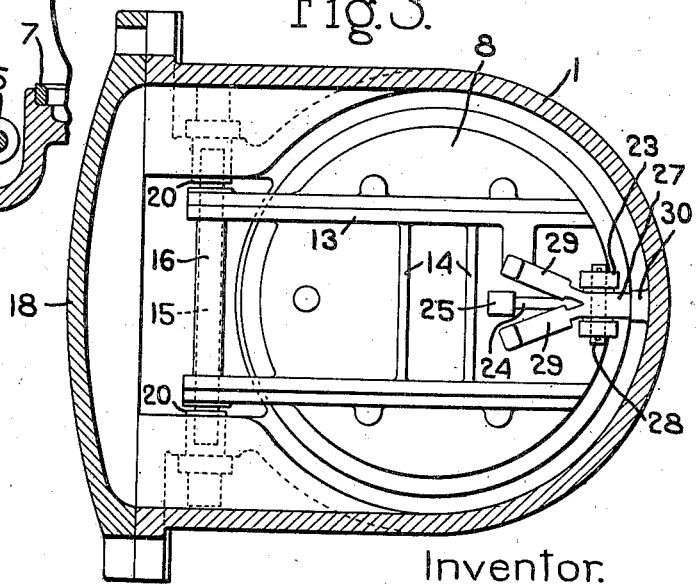
Fig. 3 is a view in transverse cross section.

The shaft 15 upon or with which the clapper is pivoted is secured in bearings 20 in the side walls of the casing and is located closely adjacent, vertically considered, the air valve seat and also well above the lower edge 21 of the inspection opening. Preferably also, the members 13, constituting the supporting arm, extend downward at their free ends substantially at right angles to the clapper so that the pivotal axis is brought well below the plane of the valves. The upper wall 22 of the casing, which determines the height of the valve, is positioned so that the clapper will just clear it when swung past it. The position of the pivot shaft 15 and this upper wall 22 then determine the height of the inspection opening and cover plate 18, while the width is determined by the width of the clapper. The arrangement and relative position of the parts as described are such that when the cover plate 18 is removed, as shown in Fig. 2, and the clapper is swung about its pivot 15 until the supporting arm 13 rests upon the lower edge 21 of the inspection opening, the clapper passes entirely through the inspection opening and stands with its valves outside the casing, as seen in Fig. 2, thus readily accessible for cleaning or repair without the necessity of disconnecting the clapper structure from the casing.

The clapper is provided on its upper surface with a latch pivotally mounted thereon at a point opposite the supporting arm, and this latch normally rocks into a position to project its latching end without the clapper periphery while it may be rocked into position to place its latching end within the clapper periphery. In the construction illustrated the clapper base is provided with upstanding lugs 23 and a midrib 24 terminating in a bunter 25 adapted to cooperate with an abutment 26 on the cover plate to limit the opening swing of the clapper. The latch 27 is pivoted on a shaft 28 mounted in the lugs 23. The latch is bifurcated at its rear end 29 to straddle the rib 24 and these bifurcations are of sufficient weight so that normally the latch is swung to cause the outer or latching end to stand outside the clapper periphery.

The valve casing is provided with a plurality of lugs such as 30, 31 and 32 in the path of the latch as the clapper swings from closed to open position. Any desired number of these lugs may be provided. The lugs 31 and 32 are positioned to latch the clapper at predetermined open positions. When the conditions are such as to cause the clapper to swing to its extreme full open position, the latch will engage the lug 32 and thus leave an entirely unobstructed path for the flow of water through the valve casing and out through the outlet 4. But frequently the clapper is not swung to this extreme position and hence to prevent the clapper from falling back to the slightly open position, determined by the lug 30, a lug 31 is placed at an intermediate position where it will not obstruct the waterway and will lock the clapper in a predetermined open intermediate position when it falls back.

It will thus be seen that the lugs on the casing in the path of the portion of the clapper opposite the supporting arm cooperate with the clapper through the medium of the latch thereon to lock the clapper against closing movement when the clapper has swung to a predetermined slightly open position, when it has swung to an intermediate open position and also when it has swung to full open position, and that the construction is such that no increase in the size of the valve casing is required beyond that necessary to provide for the swinging movement of the clapper itself.

It will thus be seen that a very simple and rugged construction of dry pipe valve is provided with the parts kept to the minimum size requisite for the functioning of the device and with the air and water valves movable into a position outside of the casing, where they may be accessible for cleaning and repair.

Having thus described the invention, what is claimed as new, and desired to be secured by Letters Patent, is:

1. A dry pipe valve comprising a casing having at the bottom an inward and upward projecting inlet pipe having a water valve seat on its upper end and with the inlet pipe tapered from its admission end to said seat to render the area of said seat substantially less than the area of the admission end, the said casing having at the top an exit opening and at one side an inspection opening, a cover plate for the inspection opening and means for removably securing it in place, an air valve seat on the casing surrounding and substantially in the plane of the water valve seat, a clapper comprising a water valve, an air valve base, an annular flexible air valve projecting from the air valve base and a supporting arm, means on the casing in the path of the portion of the clapper opposite the supporting arm cooperating with the clapper to lock the clapper against closing movement when the clapper has swung to a predetermined slightly open position and also when it has swung to a predetermined open position, and a pivot for the supporting arm located in the casing adjacent the air valve seat and well above the lower edge of the inspection opening and so positioned that, when the cover plate is removed, the clapper may be swung entirely through the inspection opening and positioned with its valves outside the casing and readily accessible for cleaning or repair.

2. A dry pipe valve comprising a casing having at the bottom an inward and upward projecting inlet pipe having a water valve seat on its upper end and with the inlet pipe tapered from its admission end to said seat to render the area of said seat substantially less than the area of the admission end, the said casing having at the top an exit opening and at one side an inspection opening, a cover plate for the inspection opening and means for removably securing it in place, an air valve seat on the casing surrounding and substantially in the plane of the water valve seat, a clapper comprising a water valve, an air valve base, an annular flexible air valve projecting from the air valve base, and a supporting arm extending substantially at right angles to the clapper and well below the plane of the valves, means on the casing in the path of the portion of the clapper opposite the supporting arm cooperating with the clapper to lock the clapper against closing movement when the clapper has swung to a predetermined slightly open position and also when it has swung to a predetermined open position, and a pivot for the supporting arm located in the casing adjacent the air valve seat and well above the lower edge of the inspection opening and so positioned that, when the cover plate is removed, the clapper may be swung entirely through the inspection opening and positioned with its valves outside the casing and readily accessible for cleaning or repair.

3. A dry pipe valve comprising a casing having at the bottom an inward and upward projecting inlet pipe having a water valve seat on its upper end and with the inlet pipe tapered from its admission end to said seat to render the area of said seat substantially less than the area of the admission end, the said casing having at the top an exit opening and at one side an inspection opening, a cover plate for the inspection opening and means for removably securing it in place, an air valve seat on the casing surrounding and substantially in the plane of the water valve seat, a clapper comprising a water valve, an air valve base, an annular flexible air valve projecting from the air valve base, and a supporting arm, a latch pivotally mounted on the clapper opposite the supporting arm and yieldingly rocked to project its latching end from a position within to a position without the clapper periphery, lugs on the casing in the path of the latch and over which the latch rides and engages to lock the clapper against closing movement when the clapper has swung to a predetermined slightly open position and also when it has swung to a predetermined open position, and a pivot for the supporting arm located in the casing adjacent the air valve seat and well above the lower edge of the inspection opening and so positioned that, when the cover plate is removed and the latch is in its retracted position within the clapper periphery, the clapper may be swung entirely through the inspection opening and positioned with its valves outside the casing and readily accessible for cleaning or repair.

WILLIS K. HODGMAN, Jr.